Patented Sept. 28, 1954

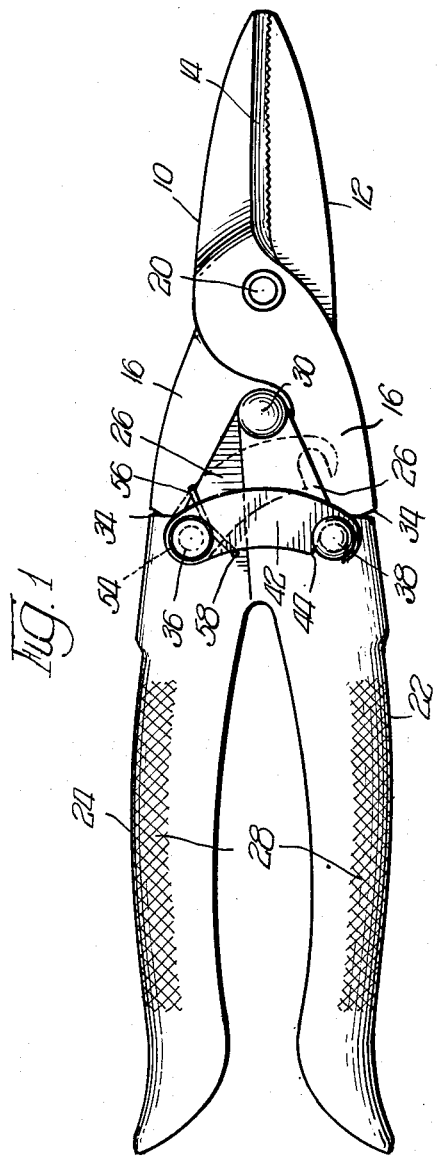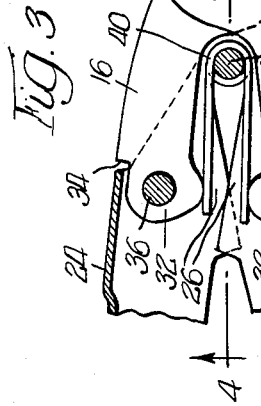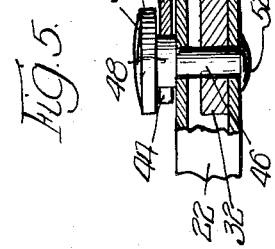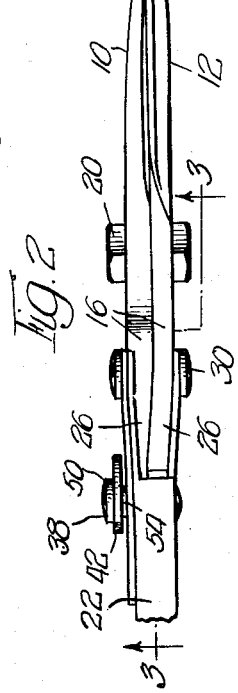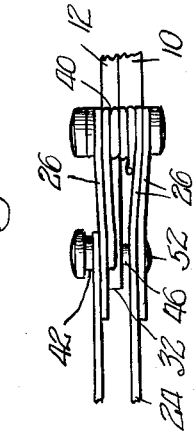

2,690,010

UNITED STATES PATENT OFFICE 2,690,010

LATCH MEANS FOR SHEARS AND THE LIKE

Frederick Keller, Sturgis, Mich., assignor to Midwest Tool and Cutlery Company, Sturgis, Mich., a corporation of Michigan Application October 10, 1952, Serial No. 314,050

2 Claims. (Cl. 30—252)

1

The present invention relates to shears and the like and, particularly, to latch means for locking or retaining the shears or the like in closed position.

An object of the present invention is to provide improved latch means for shears and like tools and particularly for shears that are normally biased to open position by spring means.

A further object of the invention is the provision of improved latch means in combination with shears having a compound leverage, wherein the latch means takes full advantage of existing structure and is adapted to be automatically unlatched when the shears are gripped for use.

A still further object of the invention is the provision, in combination with shears, of improved latch means that are economical of manufacture and assembly, yet sturdy and efficient in use.

Other objects and advantages of the present invention will become apparent in the following detailed description of a preferred embodiment thereof.

Now, in order to acquaint those skilled in the art with one manner of making and using the latch means of my invention, I shall describe, in connection with the accompanying drawings, a preferred embodiment of the invention.

In the drawings:

Figure 1 is a plan view of a compound lever shears incorporating the latch means of my invention;

Figure 2 is a partial side elevation of the shears shown in Figure 1;

Figure 3 is a view, partly in section and partly in plan, taken substantially on the line 3—3 of Figure 2;

Figure 4 is a partial sectional view taken substantially on the line 4—4 of Figure 3; and Figure 5 is an enlarged, partial sectional view taken substantially on the line 5—5 of Figure 3.

Referring to the drawings, and particularly to Figure 1, the latch means of the present invention is shown as combined with a compound lever shears, which is generally the type of shears with which the latch means is preferably associated. As shown, the shears comprise a pair of blades 10 and 12 having cutting portions 14, suitably adapted for shearing tin, for example, and lever portions 16, the two blades being pivotally connected intermediate said portions in criss-cross relation by means of a pivot 20 comprising a bolt and a nut. The handles of the shears, indicated generally at 22 and 24, respectively, are identical

2 in form and each comprise a metallic stamping including upper ear portions 26 and hand grip portions 28. In the hand grip portion thereof, each handle is generally of U-shape in cross section with the ears 26 projecting longitudinally outwardly from the flanges or legs of the U. The handles are pivotally connected to one another at the outer end of the ear portions thereof, immediately below or inside of the pivot 20 of the blades, by a pin or rivet 30. In pivotally connecting the handles, one ear portion of one handle is received within the ear portions of the other handle and one ear portion of the other handle is received within the ear portions of the first handle.

The lever portions 16 of the blades are each received within one of the handles and are each provided at the portion thereof fitting within the U-shaped portion of the respective handle with a lobe portion 32 stepped inwardly from the outer margin of the blade to present a shoulder 34 adapted to be engaged by the upper edge of the rear wall of the U-shaped portion of the respective handle to limit opening movement of the blades and handles. At the lobe portion 32 thereof, each blade is pivotally connected to the respective handle by means of a pin or rivet, 36 and 38, respectively, to provide a compound lever shears.

The use and operation of the shears will be obvious from the foregoing, opening movement of the shears being limited by the lever arrangement and abutment of the handles against the shoulders 34, and closing movement being limited by engagement of the inner margin of the handle ears 26 with the blade lobes 32. The shears are preferably normally biased to an open position and for this purpose a coiled torsion spring 40 is mounted with its coil about the handle pivot 30 and its opposite ends abutting against the lobe portion 32 of the respective blades to bias the blades and handles to a fully opened position.

In combination with suitable shear means such as those described, the latch means of the present invention comprises merely a latch member 42 utilizing the three pins or rivets 30, 36 and 38 on the handles to accomplish all of the necessary functions of the latch. As is shown, the latch 42 is mounted to the exterior of the handles and the blades and comprises merely a thin metal strap, preferably a sheet metal stamping, having a hole adjacent one end thereof and a notch or transverse slot 44, opening to one side of the strap, adjacent the other end thereof. As shown, the notch or slot 44 opens to that side of the latch opposite the pivot 30. In use, the latch or strap is pivotally mounted at one end on one of the rivets or pins 36, suitably by passing the rivet 36 through the hole in the strap. The latch bridges the space between the two rivets or pins 36 and 38 when the handles are closed, whereupon the other rivet 38 serves as a keeper for the latch by cooperation with the slot 44 in the latch.

In specific construction, the pivot 30 may merely be a conventional rivet having an enlarged head at one end thereof. The rivets 36 and 38, however, are preferably specially formed and, as shown in Figure 5, preferably comprise a shank 46, an enlarged keeper or pivot portion 48 and a flange-like head 50. The rivet is secured to the handles by passing shank 46 thereof through the ear portions of the respective handle and the lobe portion of the respective blade and peening the protruding end of the shank over, as at 52. The latch or strap 42 is preferably arcuate in form and pivotally mounted on the portion 48 of the rivet 36. The slot 44 is formed transversely of the strap and preferably with its longitudinal axis constituting a radius of the arc of the latch. Due to the formation of the slot 44, the same presents, in its locked or latched position, an inclined side wall adapted to "hook" about the portion 48 of the keeper rivet 38 under the head 50. As will be obvious, the latch, when associated with the keeper pin, will hold the blades and handles in closed position, as is shown in solid lines in Figure 1. When the latch is opened, as shown in dotted lines in Figure 1, the latch will abut against the head of the pivot 30 to stop or prevent movement of the latch out of a convenient position for manual actuation into engagement with the keeper pin. In other words, the pivot 30 serves to retain the latch, when open, in a convenient position for reclosing. With the latch retained in open position by the pivot 30, the same is disposed outside of the hand grip portions and cutting edge portions of the tool and cannot interfere with the proper actuation and use of the shears.

The latch 42 is preferably automatically operable to its unlatched or open position and, for this purpose, a coiled torsion spring 54 is mounted with its coil on the pivot portion of the pin 36 beneath the latch and with its opposite ends engaging the lower side of the latch and the upper edge of the handle normally to bias the latch upwardly into engagement with the head of the pivot 30. Specifically, one end of the spring 54 is provided with a down-turned end portion 56 adapted to engage the upper edge of the ear portion 26 of the respective handle 24 and at its opposite end is provided with an upturned end portion 58 adapted to engage the lower side of the latch 42, the spring having a predetermined stress therein so as normally to bias the latch into engagement with the head of the pivot 30. Due to the fact that the handles and blades are normally biased apart by the spring 40, and due to the particular formation of the slot 44, the latch when closed will always be "hooked" on the keeper 38 to prevent the spring 54 from opening the latch, and to prevent the spring 40 from opening the shears. (As will be apparent, the spring 54 is considerably weaker than the spring 40.) However, when the shears are picked up for use, the exertion of a slight squeezing pressure on the handles will free the latch from the keeper so that the spring 54 will release or open the latch, whereupon the shears are ready for use. Upon opening, the latch engages the pivot 30 to prevent complete turning of the latch under the urge of the spring 54 and to retain the latch in a position that will not interfere with use of the shears. In closing and latching the shears, the latch in open position is so disposed as to be moved conveniently to its latched position, even when the shears and latch are manipulated by one hand only. While reference has been made immediately hereinbefore to "hooking" of the latch, it will be appreciated that the latch could merely be held in its closed position by the frictional engagement of the latch and keeper under the urge of the spring 40.

In view of the foregoing, it will be appreciated that the present invention provides an extremely economical latch for compound lever shears and the like, wherein full advantage is taken of existing shears structure and the latch in effect consists merely of a strap and a spring. Despite the simplicity of formation thereof, however, the latch is extremely practical, efficient and sturdy in use.

While I have described my invention as applied particularly to compound lever shears constructed, for example, as tin shears as described hereinbefore, it will be appreciated that the latch means of my invention has application to other tools and other types of shears, such as grass and pruning shears and the like.

Also, while I have shown and described only a single preferred embodiment of my invention, it will be appreciated that various modifications, changes and rearrangements may be made in the preferred embodiment without departing from the scope of my invention, as defined by the appended claims.

I claim:

1. In combination with a shears or the like having a pair of handles, means pivotally connecting the handles and spring means normally biasing the handles to open position, a pivot pin mounted on one of the handles adjacent the pivotal connection thereof, a keeper pin mounted on the other of the handles adjacent the pivotal connection thereof, a latch pivotally mounted adjacent one end thereof on said pivot pin to the exterior of the handles and bridging the space between said pins when the handles are closed, said latch having a transverse notch therein adjacent the opposite end thereof opening through the side thereof opposite the pivotal connection of the handles, said notch in said latch being adapted for the reception of said keeper pin to retain the handles in closed position, said latch being so mounted as to engage the means pivotally connecting the handles when open, and a spring operatively associated with said latch normally biasing the same against said pivotal connecting means, said pivotal connecting means retaining said latch closely adjacent said keeper pin for ready actuation to latching position, said notch in the latched position of said latch accommodating slight closing movement of said handles, whereupon said spring opens said latch to condition the shears for use.

2. In a compound lever shears or the like having a pair of blades pivotally connected in crisscross relation, a pair of handles, a first pivot pin pivotally connecting the handles at the end thereof adjacent the blades, a second pivot pin pivotally connecting one of the blades with one of the handles adjacent the first pivot pin, a third pivot pin pivotally connecting the other of the blades to the other of the handles adjacent the first pivot pin, and a spring normally biasing the handles apart; a latch pivotally mounted adjacent one end thereof on the second pivot pin to the exterior of the handles and the blades and bridging the space between the second and third pivot pins when the handles are closed, said latch having a transverse slot therein adjacent the opposite end thereof, said slot in said latch opening through the side thereof opposite the first pivot pin, said slot in said latch being adapted for the reception of the third pivot pin to retain the handles in closed position, said latch being so mounted as to engage the first pivot pin when open, and a torsion spring mounted on the second pivot pin and having an end thereof engaging said latch normally to bias said latch against the first pivot pin.

References Cited in the file of this patent

UNITED STATES PATENTS

| Number | Name | Date |
| --- | --- | --- |
| 1,179,807 | Crothers | Apr. 18, 1916 |
| 1,546,317 | Rogers | July 14, 1925 |
| 2,544,197 | Vosbikian et al. | Mar. 6, 1951 |